(12) United States Patent
Ostergaard

(10) Patent No.: US 6,918,492 B2
(45) Date of Patent: Jul. 19, 2005

(54) BAFFLE ASSEMBLY FOR A SEALED SHAFT ON A VIBRATORY APPARATUS

(76) Inventor: David A. Ostergaard, 1320 Sierra Dr. NE., Cedar Rapids, IA (US) 52402

(*) Notice: Subject to any disclaimer, the term of this patent is extended or adjusted under 35 U.S.C. 154(b) by 228 days.

(21) Appl. No.: 10/020,647

(22) Filed: Dec. 12, 2001

(65) Prior Publication Data

US 2002/0053534 A1 May 9, 2002

Related U.S. Application Data

(62) Division of application No. 09/273,432, filed on Mar. 22, 1999, now Pat. No. 6,347,708.

(51) Int. Cl.[7] .................................................. B07B 1/42
(52) U.S. Cl. .................... 209/326; 209/366.5; 209/367; 209/369; 411/542; 411/371.1; 74/606 R; 74/87
(58) Field of Search .............................. 209/366.5, 367, 209/369, 326; 277/630, 637, 628; 411/542, 361, 369, 370, 371.1; 74/606 R, 61, 87

(56) References Cited

U.S. PATENT DOCUMENTS

| | | | | |
|---|---|---|---|---|
| 2,003,163 A | * | 5/1935 | Warren | 310/78 |
| 2,396,005 A | | 3/1946 | Gross et al. | 411/371.1 |
| 2,643,904 A | * | 6/1953 | Wehmanen | 411/542 |
| 2,742,790 A | * | 4/1956 | Nelson | 74/17.8 |
| 2,884,790 A | * | 5/1959 | Lehman | 74/61 |
| 2,927,495 A | | 3/1960 | Barwood | 411/371.1 |
| 3,066,568 A | | 12/1962 | Armour | 411/361 |
| 3,170,701 A | | 2/1965 | Hoover | 411/542 |
| 3,276,289 A | * | 10/1966 | Cox | 74/606 R |
| 3,422,721 A | * | 1/1969 | Yonkers | 411/369 |
| 3,519,279 A | * | 7/1970 | Wagner | 411/542 |
| 3,592,480 A | * | 7/1971 | Koranyi | 277/637 |
| 3,606,357 A | | 9/1971 | Yonkers | 411/542 |

(Continued)

*Primary Examiner*—Donald P. Walsh
*Assistant Examiner*—Matthew J. Kohner
(74) *Attorney, Agent, or Firm*—Marshall, Gerstein & Borun LLP

(57) ABSTRACT

A sealed wheel case for use on a vibrating aggregate processing device comprises a housing sized to hold a rotatable wheel supported on a shaft, the housing having a base, a peripheral sidewall, and a cover. The cover includes an aperture adapted to receive therethrough a driven portion of the shaft. A seal is disposed adjacent the shaft and the aperture, and an annular baffle is mounted to an inside surface of the cover and extends into the wheel case. The annular baffle is positioned on the inside surface of the cover to generally surrounding the shaft and the seal, and a plurality of attachment bolts are arranged to secure the housing to the frame.

12 Claims, 7 Drawing Sheets

U.S. PATENT DOCUMENTS

| | | | | |
|---|---|---|---|---|
| 3,622,167 A | * | 11/1971 | Velthoven | 277/640 |
| 3,627,334 A | * | 12/1971 | Reddy | 411/542 |
| 3,661,046 A | * | 5/1972 | Waud et al. | 411/369 |
| 3,796,437 A | * | 3/1974 | Nickly | 411/542 |
| 3,910,588 A | * | 10/1975 | Austin | 411/542 |
| 4,077,873 A | * | 3/1978 | McKibben | 209/332 |
| 4,170,549 A | | 10/1979 | Johnson | 209/363 |
| 4,177,999 A | * | 12/1979 | Raber | 411/542 |
| 4,340,469 A | * | 7/1982 | Archer | 209/315 |
| 4,347,759 A | * | 9/1982 | Renk et al. | 74/606 R |
| 4,470,324 A | * | 9/1984 | Renk et al. | 74/606 R |
| 4,519,736 A | | 5/1985 | Sigmund | 411/361 |
| 4,566,351 A | * | 1/1986 | Skipor | 74/606 R |
| 4,632,751 A | | 12/1986 | Johnson et al. | 209/326 |
| 4,655,463 A | * | 4/1987 | Inciong et al. | 277/593 |
| 4,806,810 A | * | 2/1989 | Hernden | 310/89 |
| 4,924,533 A | * | 5/1990 | Stairs, Jr. | 4/252.1 |
| 4,928,551 A | * | 5/1990 | Connelly et al. | 74/606 R |
| 5,035,155 A | * | 7/1991 | Robledo | 74/467 |
| 5,035,266 A | * | 7/1991 | Benson et al. | 138/92 |
| 5,220,846 A | * | 6/1993 | Niklewski | 74/87 |
| 5,231,886 A | * | 8/1993 | Quirk et al. | 74/61 |
| 5,562,379 A | | 10/1996 | Rausch et al. | 411/361 |
| 5,676,221 A | * | 10/1997 | Renk et al. | 184/6.12 |
| 5,687,480 A | * | 11/1997 | Khariton et al. | 29/893.2 |
| 5,924,813 A | * | 7/1999 | Sasaki | 403/11 |
| 5,957,641 A | | 9/1999 | Bogatz et al. | 411/542 |
| 6,138,980 A | * | 10/2000 | Farbotnik | 248/638 |
| 6,173,969 B1 | * | 1/2001 | Stoll et al. | 277/630 |
| 6,386,375 B1 | * | 5/2002 | Olsen | 209/366.5 |
| 6,543,788 B2 | * | 4/2003 | Ito | 277/630 |
| 6,580,189 B2 | * | 6/2003 | Mooney | 310/81 |

* cited by examiner

BAFFLE ASSEMBLY FOR A SEALED SHAFT ON A VIBRATORY APPARATUS

RELATED APPLICATIONS

This is a division of U.S. application Ser. No. 09/273,432, filed Mar. 22, 1999, now U.S. Pat. No. 6,347,708.

FIELD OF THE INVENTION

The present invention relates to vibratory devices such as vibrating screens for classifying aggregate and vibratory feeders for feeding aggregate to crushing and processing devices. More specifically, the present invention relates to an improved wheel case for housing the rotating components of the vibratory devices and for protecting those components from the loss of lubricant and/or from the ingress of contaminants.

BACKGROUND OF THE INVENTION

Vibrating screen devices and vibrating feeder devices are generally well known in the art. On a typical vibrating screening device, a system of classifying screens are mounted to a frame which in turn is supported on a system of springs. At or near the center of the device is an eccentrically weighted shaft unit, typically having one, two, or three or more rotating and eccentrically weighted shafts. On a multi-shaft unit, the shafts may be counter-rotating such that the eccentric weights are oriented in the same direction twice each revolution. This causes the screen to vibrate, which aids the classifying effects of the screen device. On a vibrating feeder, a similar shaft unit vibrates the feed trough or chute, which "throws" the aggregate contained in the trough in a desired direction. An example of such a device can be found in U.S. Pat. No. 4,340,469 issued to Archer.

The ends of the rotating shafts are supported by bearings, and each shaft includes a drive wheel or gear. The shaft drive gears are operatively coupled to an external drive motor. The eccentric weights are typically attached to the ends of the shafts adjacent the drive wheels. The bearings and the drive wheels require constant lubrication, and thus such components are disposed within a wheel housing or case containing a quantity of oil or other suitable lubricating fluid. The wheel case is typically bolted to the frame of the vibratory device.

Historically, conventional cap screws have been used to secure the wheel case to the frame of the vibratory device. However, due to the constant vibration, coupled with the constant exposure of the cap screws to the lubricating oil, such conventional cap screws are subject to loosening. The loosened cap screws provide a convenient avenue for oil loss, and also provide a convenient avenue for the ingress of dirt, water, and other contaminants. Moreover, the cap screws are not readily accessible for the purposes of re-tightening.

Accordingly, threadless fasteners have been used, such as the threadless fastener sold under the trade name Huckbolt® manufactured by the Federal Mogul Corporation. Such a fastener has a threadless collar that is pressed onto the bolt shank using hydraulic means. The collar engages a series of annular rings spaced along the bolt shank. Such bolts typically provide consistent clamping force and exhibit high resistance to loosening in most applications. However, such bolts may experience loosening when used in highly lubricated, vibrating environments, thus leading to the leakage problems outlined above. Such bolts are not easily re-tightened, and as outlined above, it is not easy to access the securing bolts in any event.

In addition to the problems with oil loss and contaminant ingress, both of which lead to premature failure of the gears and/or the bearings housed within the wheel case, a loose bolt also causes the holes through the bolted components to enlarge, thus accelerating the loss of oil or the ingress of contaminants. Moreover, loose bolts permit small pieces of aggregate to become lodged between the various bolted components, rendering it impossible to securely bolt the components together without completely disassembling and cleaning the device.

A similar leakage problem may be created where the spindles, which support the rotatable shafts, are secured to the frame. The spindles are typically disposed within the wheel case such that the shaft bearings are exposed to a constant supply of lubricating oil. Each spindle includes a mounting flange, and an O-ring seal may be provided under the mounting flange. However, the cap screws used to secure the spindle to the frame may loosen in a manner similar to the problem described above, leading to similar problems.

As mentioned above, at least one of the shafts is operatively coupled to an external drive system. Typically, one of the shafts is extended through the wheel case cover for connection to a drive motor. This penetration through the wheel case must be sealed. Due to deflections at the end of the shaft caused by the extreme operating conditions, the end of the shaft typically experiences "runout" which typically causes premature breakdown of the seal. Although labyrinth seals have been employed, a typical labyrinth seal includes a weep hole for captured oil to escape back into the sealed area. Under the extreme operating conditions of the wheel case, in which the rotating eccentric weights contact the oil supply at velocities in excess of 5000 feet per second, the resulting oil agitation throws oil through the weep hole, causing lubricant loss. Consequently, the seal becomes one additional path of lubricant loss or contaminant ingress.

Accordingly, an improved wheel case having an improved fastening system less prone to loosening and leakage is desired. It is also desired to have an improved wheel case which exhibits better lubricant retention characteristics than prior art wheel cases.

DETAILED DESCRIPTION OF THE PREFERRED EMBODIMENT

The embodiment described herein is not intended to be exhaustive or to limit the scope of the invention to the precise form disclosed. The following embodiment has been chosen and described in order to best explain the principles of the invention and to enable others skilled in the art to follow its teachings.

Figure 1:
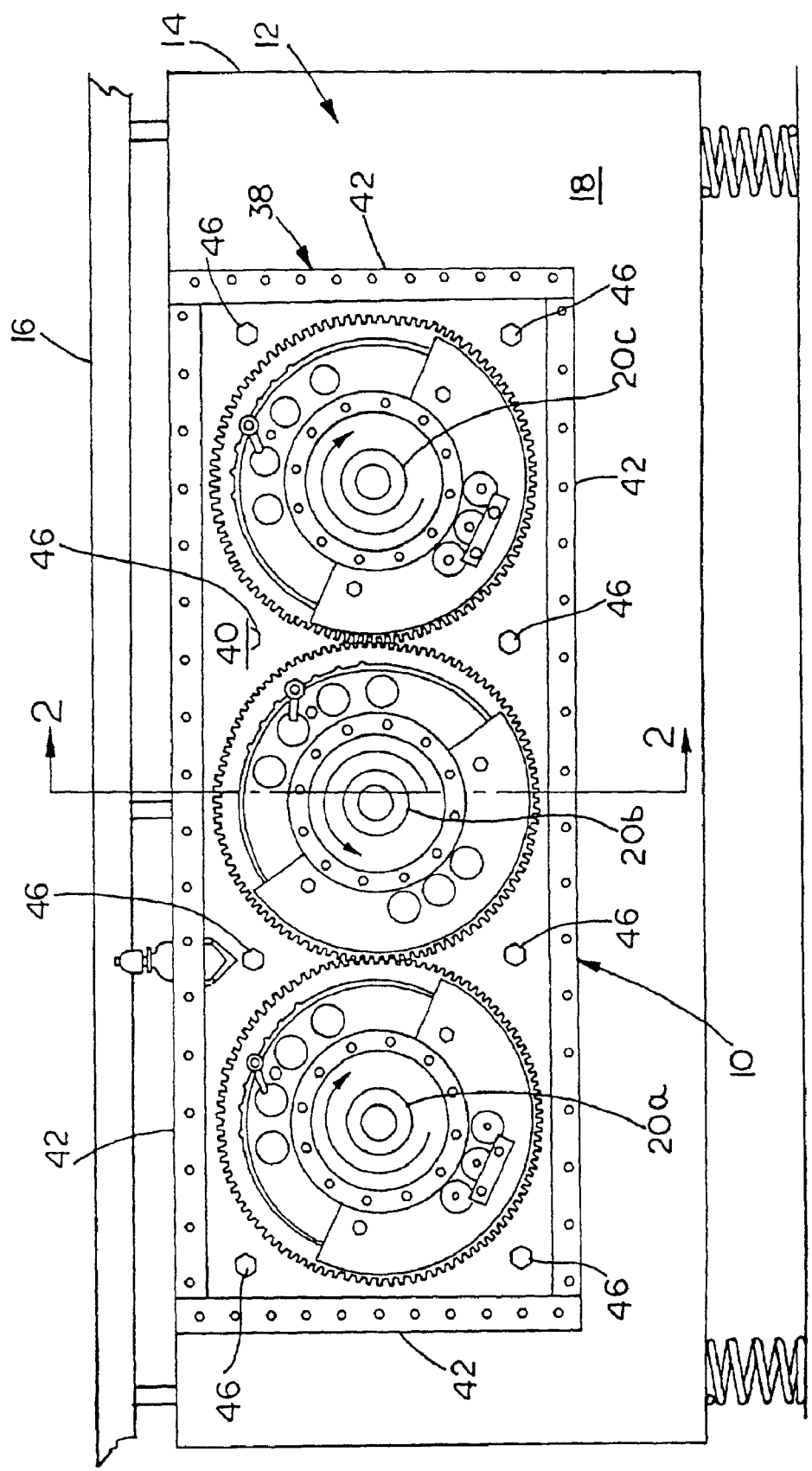
FIG. 1 is a fragmentary schematic elevational view of a vibratory device having a three shaft sealed wheel case attached to the vibratory device, the wheel case being shown with a portion cut away to reveal the wheels disposed therein.
Figure 2:
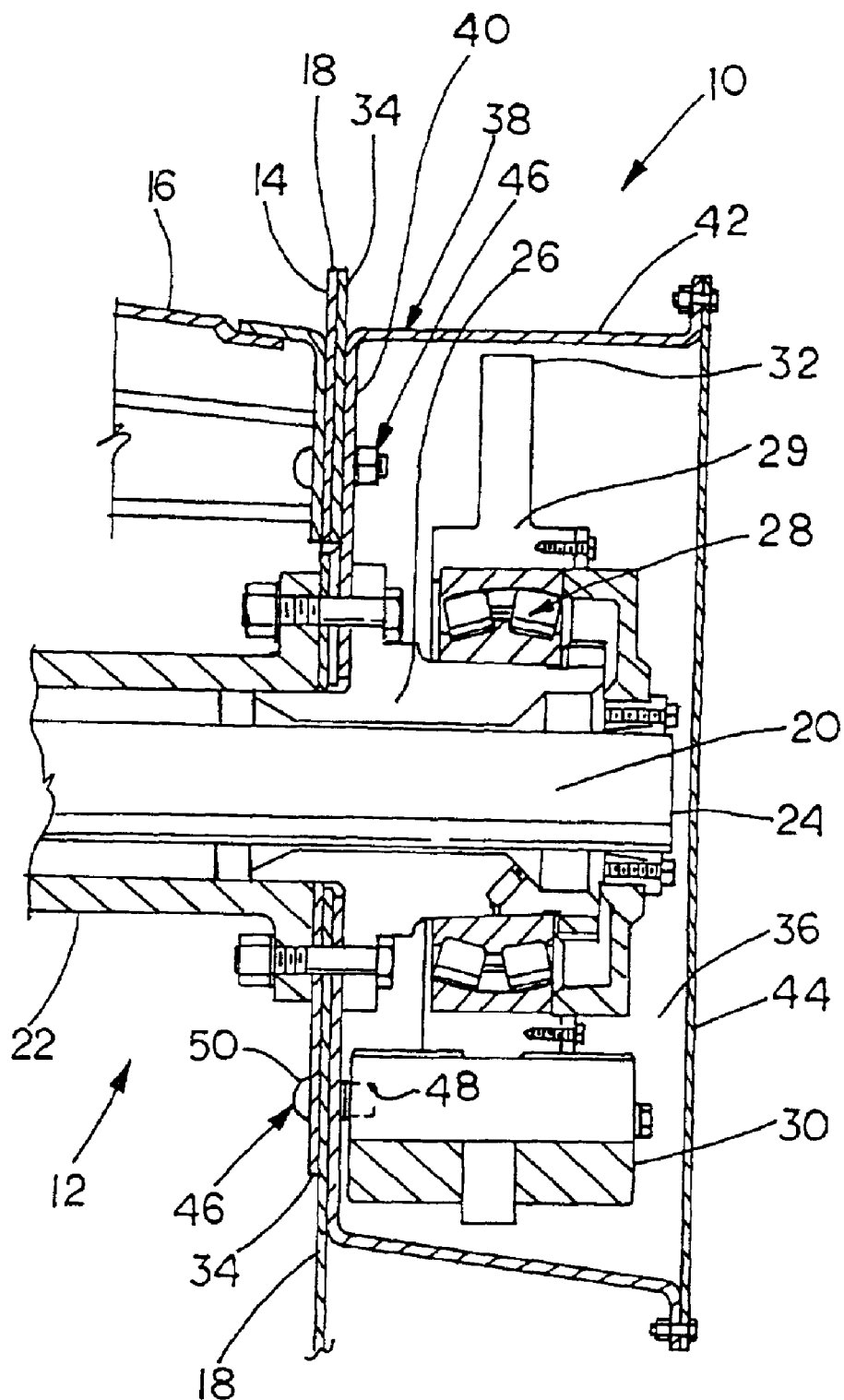
FIG. 2 is an enlarged fragmentary cross-sectional view taken along line 2—2 of FIG. 1 and illustrating a wheel case constructed in accordance with certain teachings of the present invention.

Referring now to the drawings, an improved wheel case generally indicated by the reference numeral 10 is shown in FIGS. 1 and 2 in a preferred environment of use, namely, mounted on a vibrating screen device 12 of the type commonly employed in the art to process aggregate materials by classifying and/or separating the aggregate material according to size. Persons of ordinary skill in the art will recognize that the improved wheel case 10 may also be used on other devices, such as vibrating trough feeders, as well as other devices benefitting from the features to be discussed below.

As shown in FIGS. 1 and 2, the vibrating screen device 12 typically includes a frame 14 supporting a deck 16 to which is mounted one or more classifying screens (not shown) of the type commonly employed for such purposes. A pair of opposing sidewalls 18 are secured to the frame 14, and one or more shafts 20, each housed in a housing 22, are rotatably mounted to the frame 14 and extend between the sidewalls 18.

As shown in FIGS. 1 and 2, one or more shafts 20 are provided, for example shafts 20a, 20b, and 20c. It will be understood that only a single shaft 20 will be discussed in detail. The shaft 20 includes an end 24 which is rotatably mounted to a spindle 26 by a bearing assembly 28. Attached to the end of the shaft 20 is wheel 29 having an eccentric weight 30 and a gear 32, which gear 32 may be either a drive gear or a driven gear as required. Although only one end 24 of the shaft 20 it is shown, it will be understood that the other end (not shown) of the shaft 20 is substantially similar and is rotatably mounted to the opposing sidewall 18 of the frame 14 in a similar manner. The device 12 may also include a plurality of additional side members or stiffeners 34 as required.

As shown in FIG. 2, the end 24 of the shaft 20, along with the spindle 26, the bearing assembly 28, the eccentric weight 30 and the gear 32 are all disposed within the wheel case 10. It will be understood that the wheel case 10 is adapted to contain therein a quantity of lubricating oil for the purposes of supplying lubricant to the bearing assembly 28, the gear 32, and to any other components housed within the wheel case 10 as required. It will also be understood that a portion of the eccentric weight 30 and/or a portion of the gear 32 comes into contact with, agitates, and distributes the oil about an interior 36 of the wheel case 10.

As shown in FIGS. 1 and 2, the wheel case 10 includes a housing 38 having a base 40, a peripheral sidewall 42 extending outwardly away from the base 40, and a cover 44 attachable to the sidewalls 42 so as to enclose the interior 36. The cover 44 is preferably removable as would be known to those of skill in the art in order to gain access to the various components housed within the wheel case 10. A plurality of attachment bolts 46 are provided for securing the wheel case 10 to the frame 14 (i.e., by securing the base 40 of the housing 38 to the sidewall 18 and the frame 14).

Figure 3:
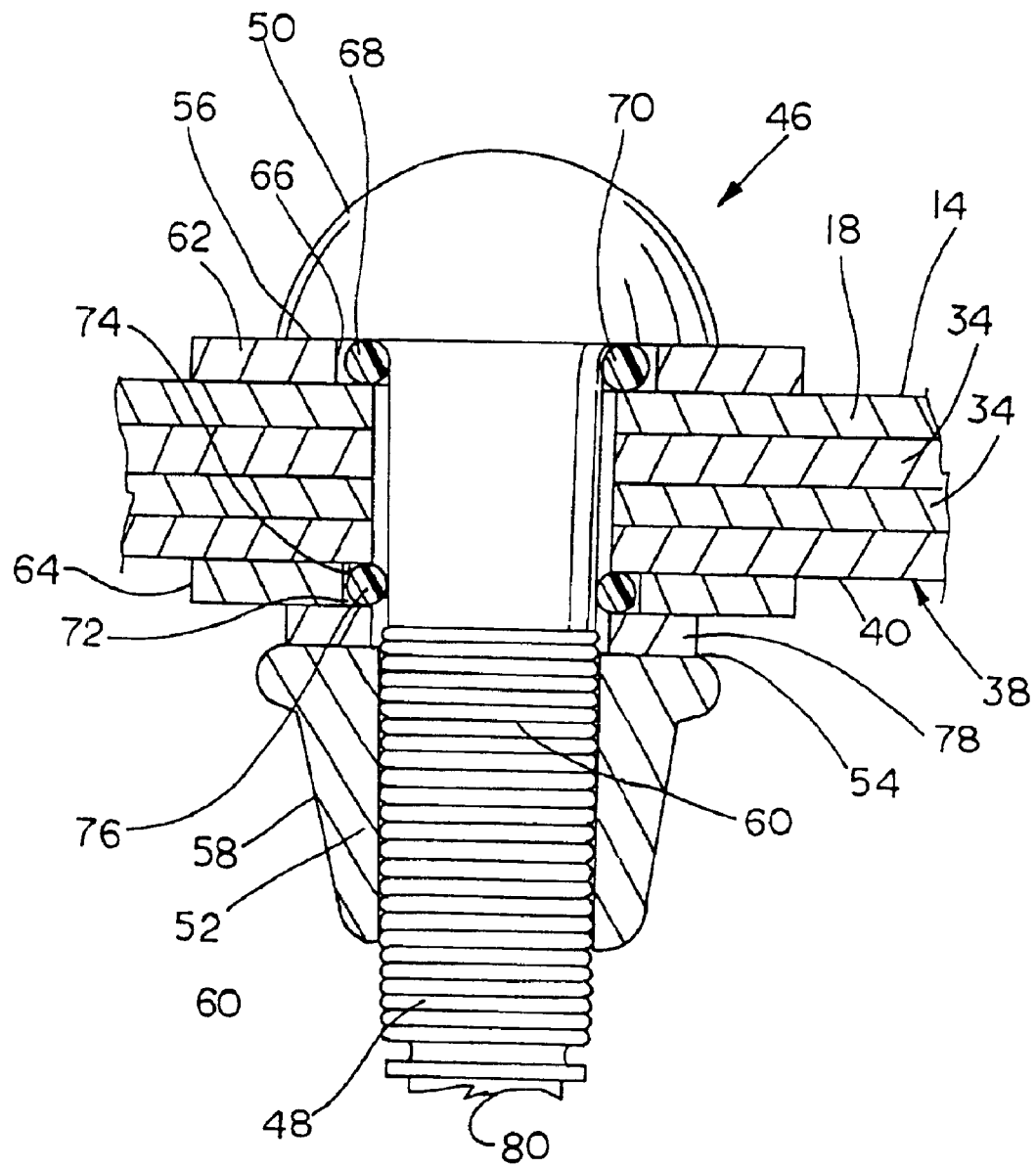
FIG. 3 is a further enlarged fragmentary cross-sectional view of a sealed attachment bolt assembled in accordance with the teachings of the present invention.

Although a number of configurations are contemplated for the attachment bolt 46, the preferred embodiment is shown in FIG. 3. Referring now to FIG. 3, the attachment bolt 46 shown therein includes an inner end 48 disposed inside the housing 38 of the wheel case 10, an outer end 50 disposed outside the housing 38, and an interconnecting shank 52. The inner end 48 includes an inner contact surface 54, while the outer end 50 includes an outer contact surface 56.

The bolt 46 is preferably a threadless bolt having a pressed on collar 58, and preferably the bolt 46 is a threadless bolt sold under the trade name Huckbolt® and is manufactured by the Federal Mogul Corporation. Other suitable fasteners, especially other suitable threadless fasteners and/or other suitable fasteners which may be fastened with a desired pre-load tension on the bolt 46 may be employed, with the desired pre-load tension typically being designated by the manufacturer or otherwise determined using well known principles of mechanics. The collar 58 is preferably pressed on using a tool, such as a hydraulic tool, of the type commonly employed for such installations. The collar 58 is retained on the shank 52 by a plurality of annular rings 60 spaced along a portion of the shank 52.

A pair of compression control washers 62, 64 are provided. The washers 62, 64 are preferably 0.108 inches thick, and have a hardness in the range of 38–45 on the Rockwell "C" hardness scale. The washer 62 includes an aperture 66 which is greater than the diameter of the shank 52 so as to define an annular cavity 68 surrounding the shank 52. The annular cavity 68 is sized to receive a resilient O-ring seal 70. Similarly, the washer 64 includes an aperture 72 which is greater than the diameter of the shank 52 so as to define an annular cavity 74 surrounding the shank 52. The annular cavity 74 is sized to receive a resilient O-ring seal 76. The O-rings 70, 76 are preferably thicker than the thickness of the washers 62, 64, and are preferably 0.140 inches thick. Still preferably, the O-rings may be manufactured of a resilient rubber compound, such as nitrile rubber.

The washer 62 and the O-ring 70 are disposed adjacent the outer contact surface 56, while the washer 64 and the O-ring 76 are disposed adjacent the inside contact surface 54, inside the wheel case 10. An additional washer 78 may be employed, but the use of such is optional.

In operation, the housing 38 and the stiffeners 34 are positioned for attachment to the sidewall 18 of the frame 14 as shown in FIG. 3. The washer 62 and the O-ring 70 are positioned on the bolt 46 adjacent the outer contact surface 56. The inner end 48 of the attachment bolt 46 is then inserted into the wheel case 10 from the opposite side of the sidewall 18. The washer 64 and the O-ring 76 are placed along the shank 52, and then the collar 58 is applied using the above-referenced tool in a known manner. The tool draws the inner end 48 (typically by pulling on a break-away portion, which is not shown but which is releasable along a frangible connection line 80). As stated above, the optional washer 78 may be included as shown.

In the process of securing the bolt 46, the inner and outer contact surfaces 54, 56 are drawn together, which compresses the O-rings 70, 76 such that they substantially fill their respective annular cavities 68, 74. The ratio between the thickness of the O-rings 70, 76 and the thickness of their associated washer 62, 64, allows for the O-rings to be compressed a desired amount to maximize their sealing capacities while preventing inadvertent damage to the O-rings via over-compression.

Figure 4:
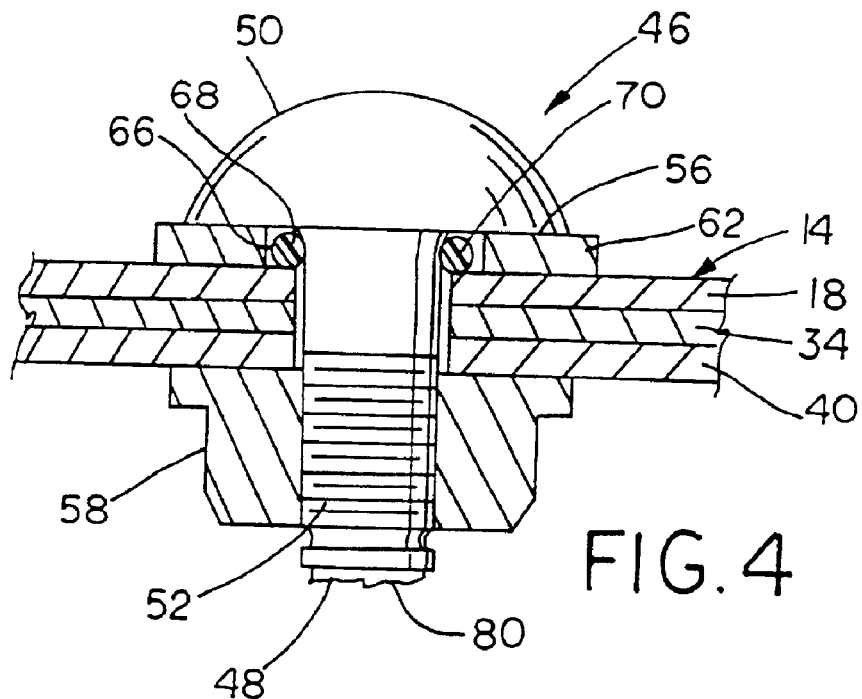
FIG. 4 is a fragmentary cross sectional view of another sealed attachment bolt constructed in accordance with the teachings of the present invention.

The embodiment shown in FIG. 4 is similar to that shown in FIG. 3, but it excludes the inner washer 64 and the inner O-ring 76, and excludes the optional washer 78.

Figure 5:
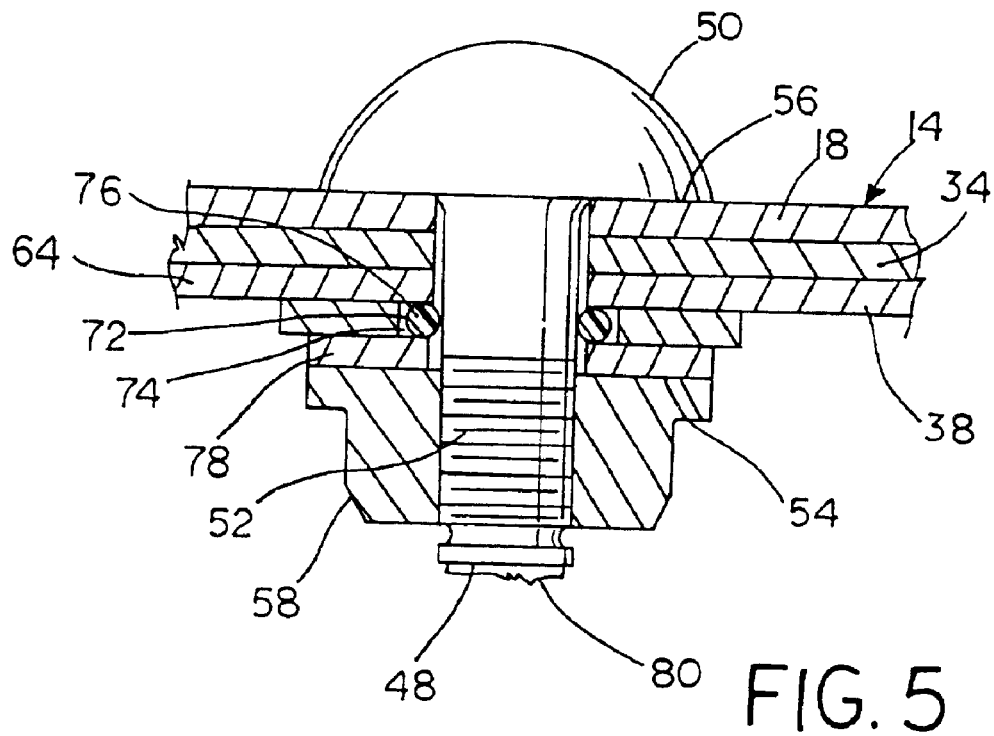
FIG. 5 is a fragmentary cross sectional view of another sealed attachment bolt constructed in accordance with the teachings of the present invention.

The embodiment shown in FIG. 5 also is similar to that shown in FIG. 3, but it excludes the outer washer 62 and the outer O-ring 70, and includes the optional washer 78.

Figure 6:
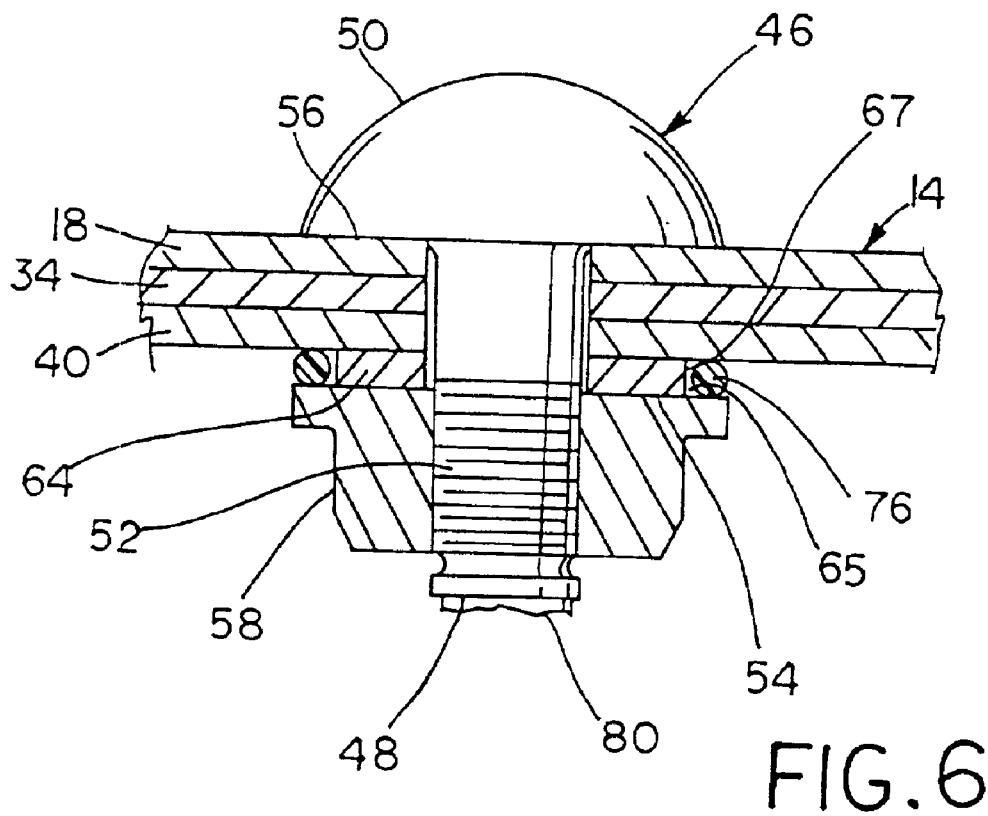
FIG. 6 is a fragmentary cross sectional view of another sealed attachment bolt constructed in accordance with the teachings of the present invention.

The embodiment shown in FIG. 6 is similar to that shown in FIG. 5, but the inner washer 64 is sized such that the inner O-ring 76 is disposed in an annular cavity 65 defined in part by an outer perimeter 67 of the washer 64. The embodiment of FIG. 6 also includes an optional washer 78.

Figure 7:
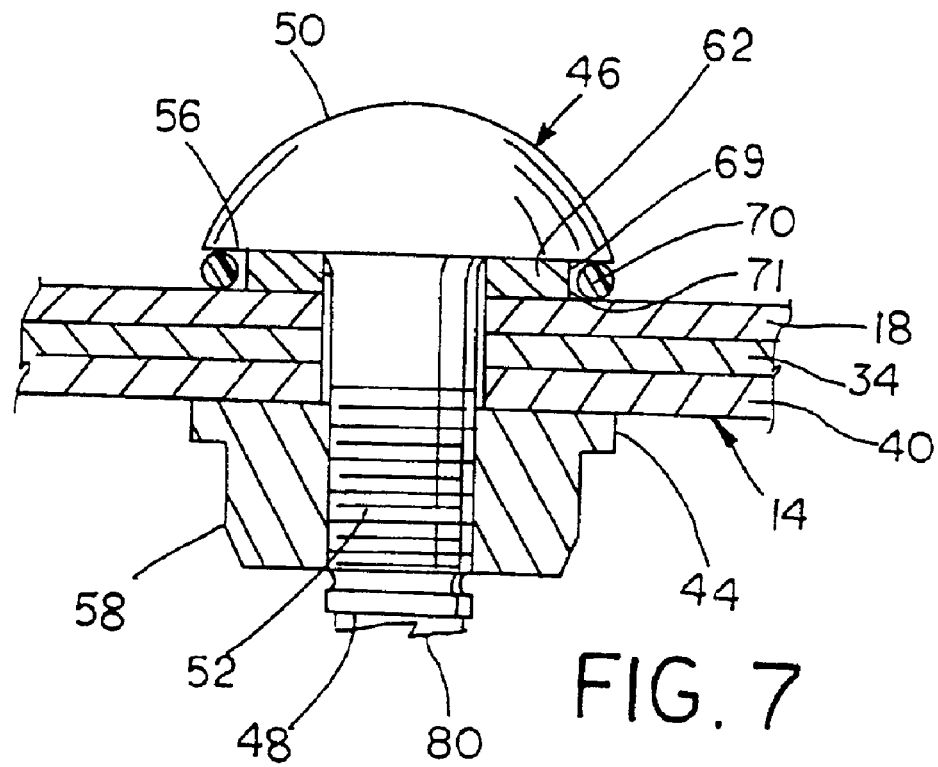
FIG. 7 is a fragmentary cross sectional view of another sealed attachment bolt constructed in accordance with the teachings of the present invention.

The embodiment shown in FIG. 7 is similar to that shown in FIG. 6, but includes an outer washer 62 sized such that the outer O-ring 70 is disposed in an annular cavity 69 defined in part by an outer perimeter 71 of the washer 62. The optional washer 78 is excluded.

Figure 8:
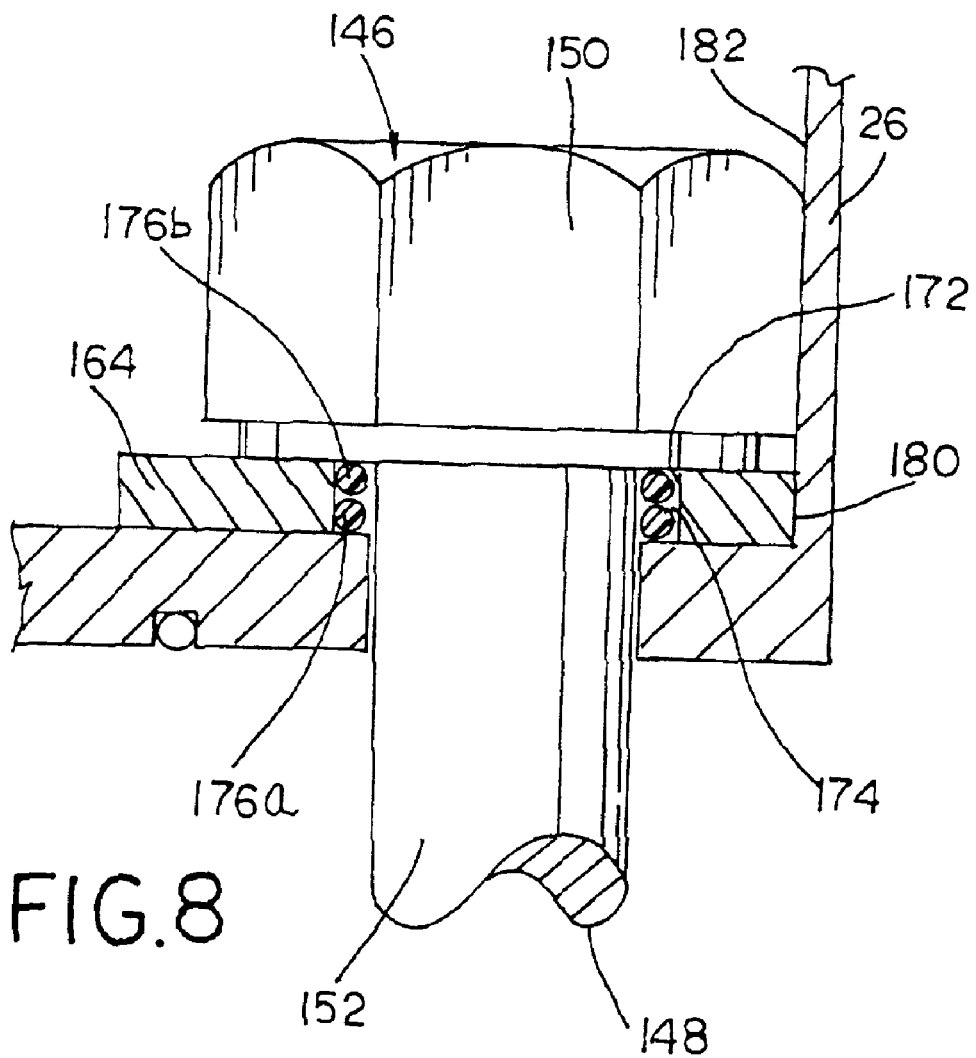
FIG. 8 is a fragmentary cross sectional view of another sealed attachment bolt constructed in accordance with the teachings of the present invention.
Figure 9:
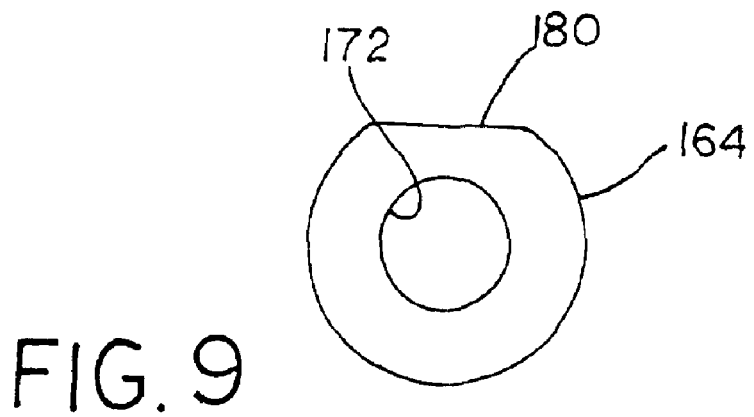
FIG. 9 is an enlarged elevational view of a clipped washer for use with the attachment bolt of FIG. 8.

Referring now to FIGS. 8 and 9, an attachment bolt 146 is shown, such as an attachment bolt used to secure the spindle 26 to the frame 14 in an area of low lateral clearance. The bolt 146 is preferably a conventional cap screw, although other suitable fasteners may be employed. The bolt 146 includes an inner washer 164 having an aperture 172 defining with the bolt shank 152 an annular cavity 174. A pair of compressible O-rings 176a, 176b are provided for insertion in the cavity 174 in stacked arrangement. The O-rings 176a, 176b will preferably have a stacked height totaling approximately 30% greater than the thickness of the washer 164. It will be noted in FIG. 9, that the washer 164 includes a truncated side portion 180, thereby permitting an inner end 150 of the attachment bolt 146 to be positioned in close proximity to an extended portion 182 of the spindle 26, such that upon application of a torque to an outer end 148, rotation of the bolt 146 is prevented. The O-rings 176a, 176b cooperate to prevent lubricant from leaking out of the wheel case 10 along the shank 152 of the bolt 146.

Figure 10:
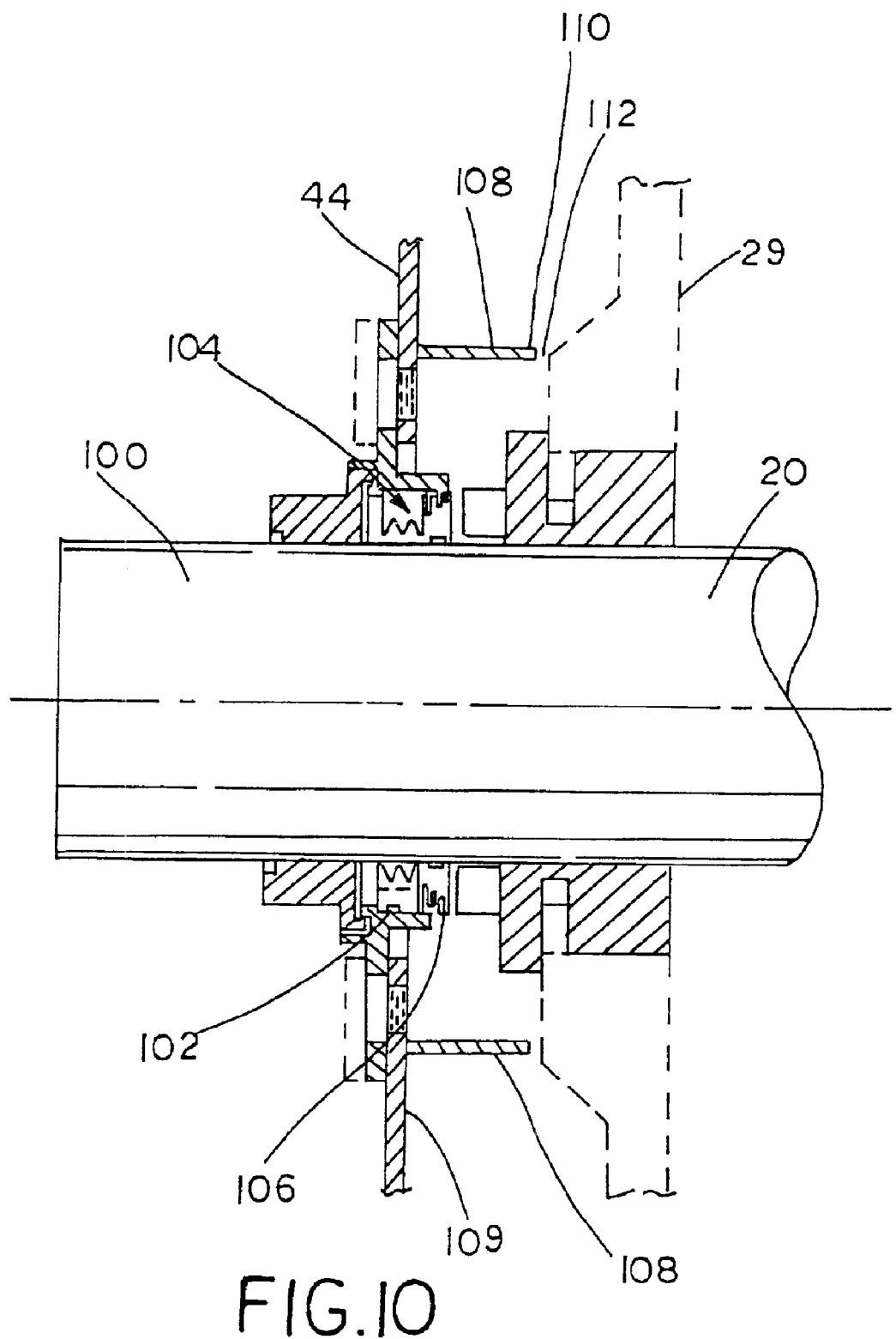
FIG. 10 is an enlarged fragmentary view similar to FIG. 2 but illustrating a seal around the penetration of the shaft through the wheel case housing constructed in accordance with the teachings of the present invention.

Referring now to FIG. 10, it will be appreciated that at least one of the shafts 20, such as, for example, the shaft 20b, will include a portion 100 extending out of the cover 44 of the wheel case 10 for operative engagement with an external drive source (not shown). Accordingly, the cover 44 includes an aperture 102 having a seal 104. Preferably, the seal 104 is a labyrinth seal, such as a ProTech® labyrinth seal manufactured by J M Clipper. The seal 104 includes at least one weep hole 106. An annular cylindrical baffle 108 is secured to an inner surface 109 of the cover 44, and is spaced outwardly from and generally surrounds the aperture 102 and the seal 104. It will be noted that the baffle 108 includes an inner end 110 which is disposed generally adjacent to the wheel 29 so as to define a relatively small and generally annular gap 112 therebetween.

It will be appreciated that, during operation of the device 12, splashing and otherwise agitated oil (not shown) is shielded from the seal 104, the weep hole 106 and the aperture 102 by the annular baffle 108. The sealing properties are enhanced by the relatively small size of the gap 112.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed:

1. A sealed wheel case for use on a vibratory device for vibrating aggregate material, the vibratory device having a frame and a rotating shaft extending transversely across the frame and having a wheel, a driven portion of the shaft being operatively coupled to a drive system, the sealed wheel case comprising:
   a housing having a base, a peripheral sidewall, and a cover, the housing being sized to receive therein the wheel and further being adapted to house therein a quantity of lubricating oil for lubricating the wheel, the cover including an aperture adapted to receive therethrough the driven portion of the shaft;
   a seal operatively connected to the shaft adjacent the aperture of the cover;
   an annular baffle mounted to an inside surface of the cover and extending into the wheel case, the annular baffle positioned on the inside surface of the cover to generally surround the shaft and the seal;
   a plurality of attachment bolts for securing the housing to the frame, each attachment bolt including a shank having an inner end and an outer end, and a pressed on collar sized to be received on the shank from the inner end;
   at least a washer disposed between the inner end and the outer end; and
   at least an O-ring disposed between the inner end and the outer end, the O-ring being concentric with the washer;
   wherein the pressed on collar and the outer end of each attachment bolt press the washer and the O-ring to sealably secure the housing to the frame.

2. The sealed wheel case of claim 1, wherein the seal is a labyrinth seal.

3. The sealed wheel case of claim 1, wherein the annular baffle includes an inner edge, the inner edge being disposed adjacent the wheel to form a gap therebetween.

4. The sealed wheel case of claim 1, the annular baffle having an inner edge disposed generally adjacent the wheel, the annular baffle sized to define an annular gap between the inner edge of the annular baffle and the wheel, the annular baffle sized to minimize the size of the gap to thereby shield the seal from the lubricating oil.

5. A sealed wheel case for use on a vibratory device for vibrating aggregate material, the vibratory device having a frame and a rotating shaft extending transversely across the frame and having a wheel, a driven portion of the shaft being operatively coupled to a drive system, the sealed wheel case comprising;
   a housing having a base, a peripheral sidewall, and a cover, the housing defining an interior sized to receive the wheel, the housing adapted to hold quantity of lubricating oil for lubricating the wheel, the cover including an aperture adapted to receive therethrough the driven portion of the shaft;
   a seal operatively connected to the shaft adjacent the wheel case aperture;
   annular baffle means for substantially isolating the seal from the interior of the wheel case, the means carried by the housing cover; and
   a plurality of attachment bolts;
   a seal assembly disposed on the attachment bolt;
   wherein each attachment bolt and the corresponding seal assembly cooperatively engage the housing and the frame to sealably secure the housing to the frame; and
   wherein each of the attachment bolts comprises:

a shank;

an inner end having a pressed on collar, the inner end and the pressed on collar disposed within the housing and having an inner contact surface, the inner contact surface defined by the pressed on collar; and an outer end disposed outside the wheel case and having an outer contact surface adjacent the frame; and wherein the seal assembly comprises:

an inner control washer disposed between the inner contact surface and the housing base, the inner control washer having a first predetermined thickness and further having an aperture therethrough sized to form with the bolt shank an inner annular cavity;

an inner O-ring sized for insertion in the inner annular cavity, the inner O-ring having a second predetermined thickness greater than the first predetermined thickness;

an outer control washer disposed between the outer contact surface and the frame, the outer control washer having a third predetermined thickness and further having an aperture therethrough sized to form with the bolt shank an outer annular cavity; and an outer O-ring sized for insertion in the outer annular cavity, the outer O-ring having a fourth predetermined thickness greater than the third predetermined thickness;

whereby in response to securement of each attachment bolt by attaching the pressed on collar each O-ring is compressed to substantially fill its adjacent annular cavity, thereby preventing the lubricant from escaping the housing and further preventing the pressed on collar from loosening.

6. A vibratory device for vibrating aggregate material and comprising:

a frame;

a rotating shaft extending transversely across the frame and having a wheel, a driven portion of the shaft adapted for attachment to a drive system; a wheel housing, the housing including a base, a peripheral sidewall, and a cover, the housing defining an interior sized to receive a rotatable wheel, the interior adapted to hold a quantity of lubricating oil;

an aperture through the cover, the aperture adapted to receive therethrough the driven portion of the shaft;

a seal operatively engaging the driven portion of the shaft and arranged to inhibit lubricant from escaping the interior of the housing;

an annular baffle carried by an interior surface of the housing and positioned to surround the seal and the aperture, a cylindrical end of the baffle cooperating with the wheel to define an annular gap, the baffle sized to minimize the size of the gap, thereby inhibiting the flow of lubricating oil from the wheel toward the seal;

a plurality of sealed attachment bolts for securing the housing to the frame, each attachment bolt including a shank;

at least a washer mounted on the shank, the washer having an aperture therethrough sized to form an annular cavity with the shank; and at least an O-ring sized for insertion in the annular cavity, the O-ring having a thickness greater than a thickness of the washer;

wherein in response to securement of the attachment bolt, the O-ring is compressed to substantially fill the annular cavity, thereby preventing the lubricant from escaping.

7. The device of claim 6, wherein the seal is a labyrinth seal.

8. The device of claim 6, wherein the annular baffle includes an inner edge, the inner edge being disposed adjacent the wheel to form a gap therebetween.

9. The device of claim 6, the annular baffle having an inner edge disposed generally adjacent the wheel, the annular baffle sized to define an annular gap between the inner edge of the annular baffle and the wheel, the annular baffle sized to minimize the size of the gap to thereby shield the seal from the lubricating oil.

10. A sealed wheel case for use on a vibratory device for vibrating aggregate material, the vibratory device having a frame and a rotating shaft extending transversely across the frame and having a wheel, a driven portion of the shaft being operatively coupled to a drive system, the sealed wheel case comprising:

a housing having a base, a peripheral sidewall, and a cover, the housing defining an interior sized to receive the wheel, the housing adapted to hold quantity of lubricating oil for lubricating the wheel, the cover including an aperture adapted to receive therethrough the driven portion of the shaft;

a seal operatively connected to the shaft adjacent the wheel case aperture;

annular baffle means for substantially isolating the seal from the interior of the wheel case, the means carried by the housing cover;

a plurality of attachment bolts;

a seal assembly disposed on the attachment bolt;

wherein each attachment bolt and the corresponding seal assembly cooperatively engage the housing and the frame to sealably secure the housing to the frame; and wherein the seal is a labyrinth seal.

11. A sealed wheel case for use on a vibratory device for vibrating aggregate material, the vibratory device having a frame and a rotating shaft extending transversely across the frame and having a wheel, a driven portion of the shaft being operatively coupled to a drive system, the sealed wheel case comprising:

a housing having a base, a peripheral sidewall, and a cover, the housing defining an interior sized to receive the wheel, the housing adapted to hold quantity of lubricating oil for lubricating the wheel, the cover including an aperture adapted to receive therethrough the driven portion of the shaft;

a seal operatively connected to the shaft adjacent the wheel case aperture;

annular baffle means for substantially isolating the seal from the interior of the wheel case, the means carried by the housing cover;

a plurality of attachment bolts;

a seal assembly disposed on the attachment bolt;

wherein each attachment bolt and the corresponding seal assembly cooperatively engage the housing and the frame to sealably secure the housing to the frame; and wherein the annular baffle includes an inner edge, the inner edge being disposed adjacent the wheel to form a gap therebetween.

12. A sealed wheel case for use on a vibratory device for vibrating aggregate material, the vibratory device having a frame and a rotating shaft extending transversely across the frame and having a wheel, a driven portion of the shaft being operatively coupled to a drive system, the sealed wheel case comprising:

a housing having a base, a peripheral sidewall, and a cover, the housing defining an interior sized to receive the wheel, the housing adapted to hold quantity of lubricating oil for lubricating the wheel, the cover including an aperture adapted to receive therethrough the driven portion of the shaft;

a seal operatively connected to the shaft adjacent the wheel case aperture;

annular baffle means for substantially isolating the seal from the interior of the wheel case, the means carried by the housing cover; and a plurality of attachment bolts;

a seal assembly disposed on the attachment bolt;

wherein each attachment bolt and the corresponding seal assembly cooperatively engage the housing and the frame to sealably secure the housing to the frame; and the annular baffle having an inner edge disposed generally adjacent the wheel, the annular baffle sized to define an annular gap between the inner edge of the annular baffle and the wheel, the annular baffle sized to minimize the size of the gap to thereby shield the seal from the lubricating oil.

* * * * *